Sept. 25, 1956
J. L. DE PERSIA
2,764,117
VEHICLE PROPELLED BY AUGER TYPE ROTORS
Filed Dec. 12, 1952
2 Sheets-Sheet 1
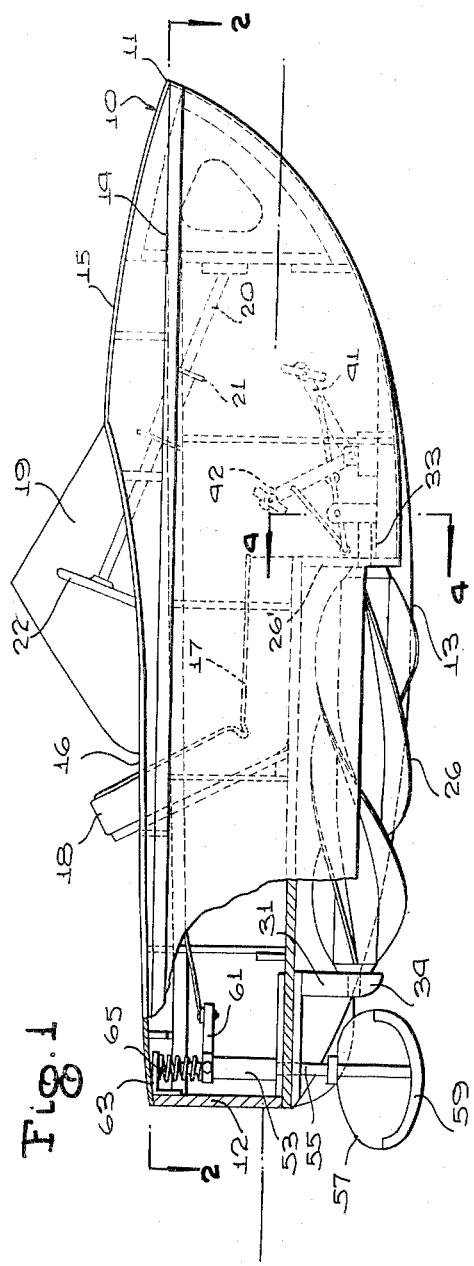
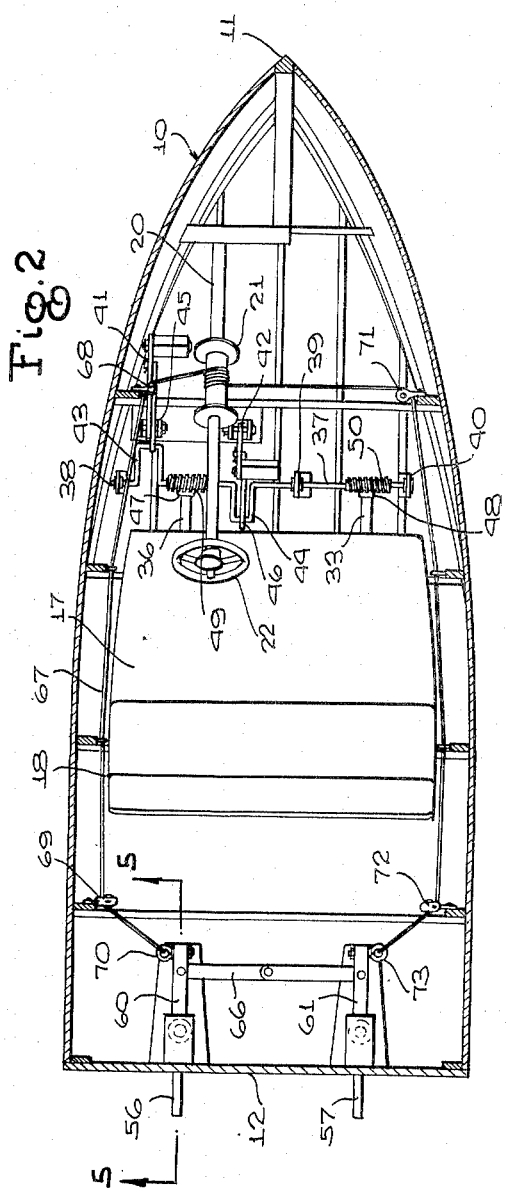
INVENTOR
JOHN L. DE PERSIA
BY
McMorrow, Berman & Davidson
ATTORNEYS Sept. 25, 1956  J. L. DE PERSIA  2,764,117
VEHICLE PROPELLED BY AUGER TYPE ROTORS
Filed Dec. 12, 1952  2 Sheets-Sheet 2
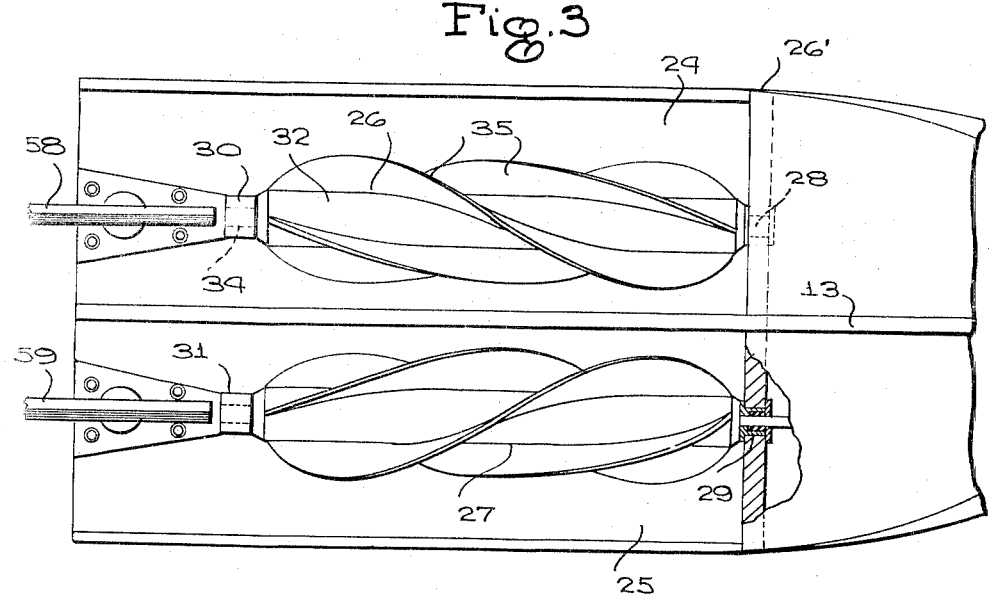
Fig.3
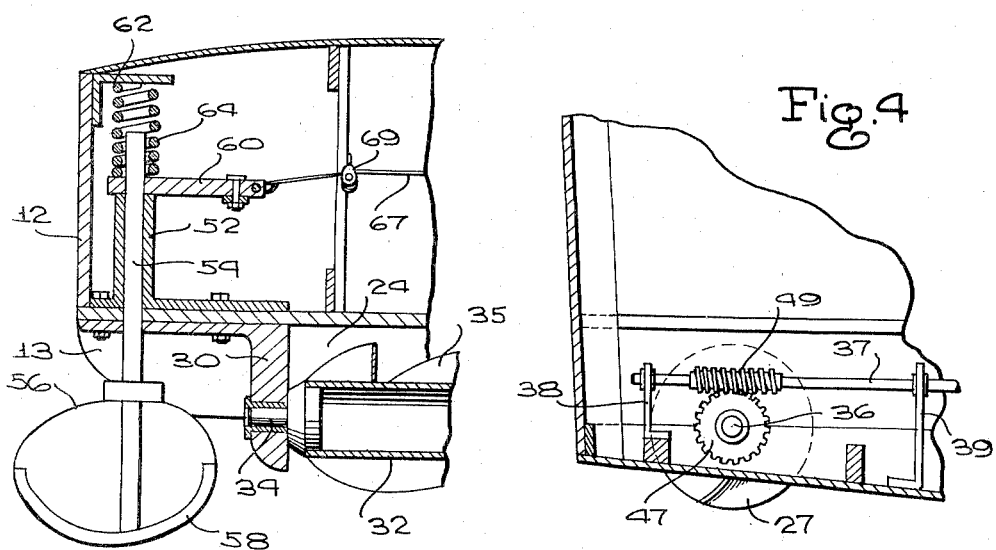
Fig.4
Fig.5
INVENTOR
JOHN L. DePERSIA
BY
McMorrow, Berman & Davidson
ATTORNEYS

2,764,117
VEHICLE PROPELLED BY AUGER TYPE ROTORS

John L. De Persia, Chicago, Ill.

Application December 12, 1952, Serial No. 325,611

2 Claims. (Cl. 115—1)

This invention relates to a vehicle propelled by auger type rotors and more particularly to such a vehicle arranged to function as a boat in water or as a sled on ice.

It is among the objects of the invention to provide an improved vehicle which is propelled by auger type rotors projecting below the vehicle and extending longitudinally thereof and in which the rotors may be driven by the occupant of the vehicle or may be power driven, as desired; which is constructed and arranged to run in water or on ice covering the water and will operate in shallow or weedy water without difficulty; which can be efficiently steered either in water or on ice; and which is simple and durable in construction, economical to manufacture, and effective and efficient in operation.

Other objects will become apparent from a consideration of the following description and the appended claims in conjunction with the accompanying drawings, wherein:

Figure 1 is a side elevational view of a vehicle illustrative of the invention with a portion broken away and shown in cross section to better illustrate the construction thereof;

Figure 2 is a longitudinal cross sectional view on the line 2—2 of Figure 1;

Figure 3 is a fragmentary bottom plan view of the vehicle;

Figure 4 is a fragmentary cross sectional view on an enlarged scale on the line 4—4 of Figure 1;

Figure 5 is a fragmentary cross sectional view on an enlarged scale on the line 5—5 of Figure 2.

With continued reference to the drawings, the vehicle comprises a hull, generally indicated at 10, having a front end or bow 11 and a transverse transom 12 at its rear end or stern. A convexly curved keel 13 extends from the bow 11 to the transom 12 medially of the width of the bottom of the hull and gunwhales 14 extend from the bow to the opposite ends of the transom 12 at the upper edge of the transom. A deck or covering 15 is supported on the gunwhales 14 and covers the portion of the top of the hull surrounding a cockpit 16 and a seat 17 is mounted in the hull at the rear end of the cockpit and provided with a back 18 which inclines upwardly and rearwardly from the seat at the rear end of the cockpit. A curved shield 19 of transparent material is secured at its lower edge to the edge of the cover 15 around the front end of the cockpit and is inclined upwardly and rearwardly from the edge of the cover at the front end of the cockpit, and a steering shaft 20 is journaled in the hull adjacent the front end of the latter and provided intermediate its length with a cable spool 21 and at its upper end with a steering wheel 22. The hull is provided with recesses or inverted troughs 24 and 25 which open through the bottom of the hull on opposite sides of the keel 13 and extend from a bulkhead 26' disposed transversely of the hull intermediate its ends through the stern of the hull. These recesses or troughs are concavely curved transversely thereof and auger type rotors 26 and 27 are disposed in and extend longitudinally of the recesses 24 and 25 respectively.

The bulkhead 26' is provided with transversely spaced bearing apertures disposed symmetrically on opposite sides of the keel 13 and extending through said bearing apertures are bearing bushings 28 and 29. Bearing blocks 30 and 31 are carried by the hull and extend downwardly therefrom near the rear ends of the recesses 24 and 25 respectively and the rotors 26 and 27 are journaled at their opposite ends in the corresponding bearing bushings and bearing blocks.

Each rotor comprises a hollow cylindrical barrel 32, the rotor 26 carrying a drive shaft 33 and a stub shaft 34 which shafts project axially from the front and rear ends respectively of the barrel and the rotor 27 carrying a drive shaft 36 and a stub shaft 34 which shafts 36 and 34 of the rotor 27 also project axially from the front and rear ends respectively of the barrel. The drive shafts 33 and 36 are journaled in the front bearing bushings 28 and 29 respectively, while the stub shaft 34 of the rotor 26 is journaled in the bearing block 30 and the stub shaft 34 of the rotor 27 is journaled in the bearing block 31. Outwardly projecting helical vanes 35 are carried by the barrels 32 and extend from one end to the other of the barrels. Each vane extends spirally about its associated barrel to an angle of approximately 180 degrees, and the vanes on the adjacent barrels wind in opposite directions.

In the arrangement illustrated there are four vanes equally spaced apart around each of the cylindrical barrels, and the vanes diminish in width adjacent opposite ends of the barrels to facilitate their engagement with the surface being traversed.

A crank shaft 37 is journaled in bearing blocks 38, 39 and 40 mounted on the bottom of the hull and extends transversely across said hull above the drive shafts 33. Foot pedal levers 41 and 42 are pivotally mounted each at one end on the bottom of the hull forwardly of the crank shaft 37 and the crank shaft is provided with cranks 43 and 44 connected to the levers 41 and 42 by links 45 and 46 respectively.

A worm gear 47 is mounted on the front end of the drive shafts 33 and 36 and these worm gears mesh with worms 50 and 49 carried by the crankshaft 37 adjacent opposite ends thereof in order to impart rotation to the rotors 26 and 27. The rotors rotate in opposite directions at substantially the same speed when the crank shaft 37 is rotated by the foot pedal levers 41 and 42.

The auger type rotors 26 and 27 extend somewhat below the adjacent portion of the keel 13 so that when the vehicle is supported on ice it rests on the lower portions of these rotors and rotation of the rotors in the proper direction will impart forward movement to the vehicle. When the vehicle floats on water the rotors 26 and 27 are submerged in the water and upon rotation in the proper direction impart forward movement to the vehicle by the reaction of the spirally wound vanes 35 with the adjacent water.

Bearing sleeves 52 and 53 are mounted on the bottom of the hull near the inner side of the transom 12 and are so positioned that their longitudinal center lines are substantially perpendicular to a plane including the rotational axes of both of the rotors 26 and 27 and are substantially in a common plane perpendicular to the rotational axes of the rotors and the longitudinal center line of each sleeve is substantially in a plane extending longitudinally of the hull and including the rotational axis of the corresponding rotor. Rudder shafts 54 and 55 extend through and are journaled in the sleeves 52 and 53 respectively and these shafts extend downwardly from the bottom of the hull rearwardly of the corresponding rotors 26 and 27. Rudders 56 and 57 of somewhat elliptical shape are mounted on the lower ends of the shafts 54 and 55 respectively, the shafts being disposed intermediate the length of the corresponding rudder and extending transversely thereof. Runners 58 and 59 are provided on the bottom edges of the rudders 56 and 57 respectively to support the rear end of the vehicle when the vehicle is supported on ice.

Steering arms 60 and 61 are secured to the shafts 54 and 55 respectively at the upper ends of the sleeves 52 and 53 and angle brackets 62 and 63 are secured to the transom 12 and overlie the upper ends of the shafts 54 and 55 respectively. A compression spring 64 is disposed between the arm 60 and the bracket 62 and a similar compression spring 65 is disposed between the bracket 63 and the arm 61.

When the vehicle floats on water the springs 64 and 65 force the shafts 54 and 55 downwardly until the rudders 56 and 57 are entirely submerged in the water, but, when the vehicle is supported on ice, the springs permit the rudder shafts to move upwardly so that the runners 58 and 59 along the bottom edges of the rudders rest on the surface of the ice on which the vehicle is supported.

A tension bar 66 interconnects the arms 60 and 61 near the ends of the arms remote from the corresponding rudder shafts 54 and 55 to constrain the rudder shafts to simultaneous and coextensive rotational movements and a cable 67 is wound intermediate its length on the cable spool 21 and extended rearwardly from the cable spool along the respectively opposite sides of the hull, one end portion of the cable being carried over the cable sheaves 68 and 69 at one side of the hull and connected at its end to the arm 60 by suitable means, such as the ring bolt 70, and the other end portion of the cable being carried over cable sheaves 71 and 72 secured to the other side of the boat and secured at its end to the distal end of the arm 61 by the ring bolt 73.

With this arrangement, the rudders are turned in directions to steer the vehicle when the steering shaft 20 is rotated by the steering wheel 22.

With the above described rudder arrangement, the rudders will effectively steer the vehicle whether the vehicle is floating on water or supported on ice.

The vehicle disclosed herein is particularly adapted for use as a water-borne vehicle but it also is adapted for high speed operation on ice or snow. Obviously, an engine or an occupant operated mechanism may be employed for driving the propulsion mechanism of the vehicle.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims, are therefore, intended to be embraced therein.

What is claimed is:

1. An amphibious vehicle comprising a boat hull having a bulkhead extending thereacross intermediate the ends thereof, said hull having spaced parallel inverted troughs facing downwardly and forming a part of its bottom, said troughs extending from the bulkhead rearwardly therefrom and through the stern of the hull, elongated spiral propellers mounted in said troughs for rotation about their longitudinal axes, the perimeters of the propellers extending below the bottom of the hull for engaging an ice surface and supporting the hull in spaced relation thereto while propelling the hull therealong, said propellers also reacting against water in a body of water when the hull is afloat therein for propelling the hull, a seat mounted on the troughs adjacent the bulkhead, and propeller driving means mounted in the hull adjacent the bulkhead and operatively connected to the propellers for rotating them about their longitudinal axes and propelling the hull.

2. An amphibious vehicle comprising a boat hull having a bulkhead extending thereacross intermediate the ends thereof, a keel carried by the hull and extending from the bulkhead to the stern of the hull, said keel cooperating with opposite sides of the hull in defining inverted troughs which face downwardly and form a part of the bottom of the hull and extend from the bulkhead through the stern of the hull, elongated spiral propellers mounted in the troughs for rotation about their longitudinal axes, the perimeters of the propellers extending below the keel and the bottom of the hull for engaging an ice surface and supporting the hull in spaced relation thereto while propelling the hull therealong, said propellers reacting against water in a body of water in which the hull is afloat for propelling the hull, a seat mounted on the troughs adjacent the bulkhead, and manually actuated propeller driving means mounted in the hull adjacent the bulkhead and operatively connected to the propellers for rotating them and propelling the vehicle.

References Cited in the file of this patent

UNITED STATES PATENTS

| Number | Name | Date |
| --- | --- | --- |
| 571,628 | Tucker | Nov. 17, 1896 |
| 600,672 | Harvey | Mar. 15, 1898 |
| 669,210 | Burch | Mar. 5, 1901 |
| 722,908 | Rosenaw | Mar. 17, 1903 |
| 903,540 | Burch | Nov. 10, 1908 |
| 1,216,246 | Roggasch | Feb. 13, 1917 |
| 1,289,808 | Kennedy et al. | Dec. 31, 1918 |
| 1,646,611 | Code | Oct. 25, 1927 |
| 2,376,647 | Akins | May 22, 1945 |